(12) United States Patent
Tanaka

(10) Patent No.: US 7,320,552 B2
(45) Date of Patent: Jan. 22, 2008

(54) IMAGE FORMING APPARATUS

(75) Inventor: Tomio Tanaka, Fukushima-ken (JP)

(73) Assignee: Oki Data Corporation, Tokyo (JP)

( * ) Notice: Subject to any disclaimer, the term of this patent is extended or adjusted under 35 U.S.C. 154(b) by 588 days.

(21) Appl. No.: 10/875,957

(22) Filed: Jun. 25, 2004

(65) Prior Publication Data

US 2004/0263893 A1    Dec. 30, 2004

(30) Foreign Application Priority Data

Jun. 30, 2003    (JP)    ............................. 2003-186049

(51) Int. Cl.
*B41J 11/44*    (2006.01)
(52) U.S. Cl. .......................................... 400/76; 400/70
(58) Field of Classification Search .................. 400/70, 400/76
See application file for complete search history.

(56) References Cited

U.S. PATENT DOCUMENTS 6,338,480 B1 *    1/2002    Endo ........................... 271/104
6,782,218 B2 *    8/2004    Sekiguchi et al. ............ 399/81

\* cited by examiner

*Primary Examiner*—Minh Chau
(74) *Attorney, Agent, or Firm*—Takeuchi & Kubotera, LLP

(57) ABSTRACT

An image forming apparatus, which is able to output menu items and set values provided for the respective menu items, outputs the set value changed from the factory default set value and the menu item corresponding to the set value distinctly from unchanged set values and menu items corresponding to the unchanged set values, thereby minimizing the time and errors in checking the changed menu item and set value.

10 Claims, 8 Drawing Sheets

Menu Map
_____

PRINTING MENU
        COPY NUMBER      1
        PAPER TRAY       TRAY 1
        RESOLUTION      600 dpi
        EDITING SIZE     LETTER

SYSTEM MENU
        POWER SAVE TIME  60 min
        OPERATION MODE   AUTO
        TIME-UT PRINTING  40 sec
        JAM RECOVERY     ON MEMORY MENU
        RECEIVING BUFFER SIZE   1Mb
        RESOURCE SAVE AREA     OFF

Menu Map
───────────────

PRINTING MENU
        COPY NUMBER        1
        PAPER TRAY         TRAY 1
        RESOLUTION        600 dpi
        EDITING SIZE       LETTER
SYSTEM MENU
        POWER SAVE TIME  60 min
        OPERATION MODE   AUTO
        TIME-OUT PRINTING  40 sec
        JAM RECOVERY     ON
MEMORY MENU
        RECEIVING BUFFER SIZE 1Mb
        RESOURCE SAVE AREA   OFF

IMAGE FORMING APPARATUS

BACKGROUND OF THE INVENTION

1. Field of the Invention

The present invention relates to an image forming apparatus capable of outputting menu items and set values for the respective menu items. Examples of the image forming apparatus include a printer, facsimile, and coping machine.

2. Description of the Related Art

In a printer, for example, there is a menu for setting a printer operation environment. The menu includes a number of menu items such as the number of copies and the size of paper. Each menu item has a set value and a few settable values. For the paper size, for example, the default value is "A4" and the settable values are "Letter, A5, and A6". One of the methods for checking the menu item and the set value is printing them on paper. This printing is called "menu map printing".

As FIG. 8 shows, the menu map printed on a paper sheet 1 includes the menu items and the set values for the respective menu items. This menu map is printed by the key operation of the user or the menu map printing command of a host computer connected to the printer. The menu map is provided for the user to check the set values. Especially, at a time of printer breakdown, it is necessary to compare the menu item value changed by the user with the factory default value.

The conventional menu map clearly shows the menu items and their set values but fails to show if any factory default value changed by the user and the menu item changed by the user. Consequently, it is necessary to compare the set values on the menu map and those of the owner's manual, presenting the problem that it takes a long time or causes an error in the comparison. Thus, it has been proposed to provide a menu map that shows both the factory default values and the current set values side by side. However, this method of showing the values side by side still fails to solve the above problem when the number of menu items becomes large.

SUMMARY OF THE INVENTION

Accordingly, it is an object of the invention to provide an image forming apparatus, which is able to output menu items and set value for the respective menu items, capable of outputting the set value changed from the first value and the menu item corresponding to the set value distinctly from unchanged set values and the corresponding menu items. Such output on the printout or display instantly shows whether there is any menu item whose set value has been changed, the menu item whose set value has been changed, and the set value after change.

BRIEF DESCRIPTION OF THE DRAWINGS

FIG. 4 is a diagram of a menu map printed according to the first embodiment;

FIG. 8 is a diagram of print-out for the conventional menu map.

DESCRIPTION OF THE PREFERRED EMBODIMENTS

First Embodiment

Figure 1:
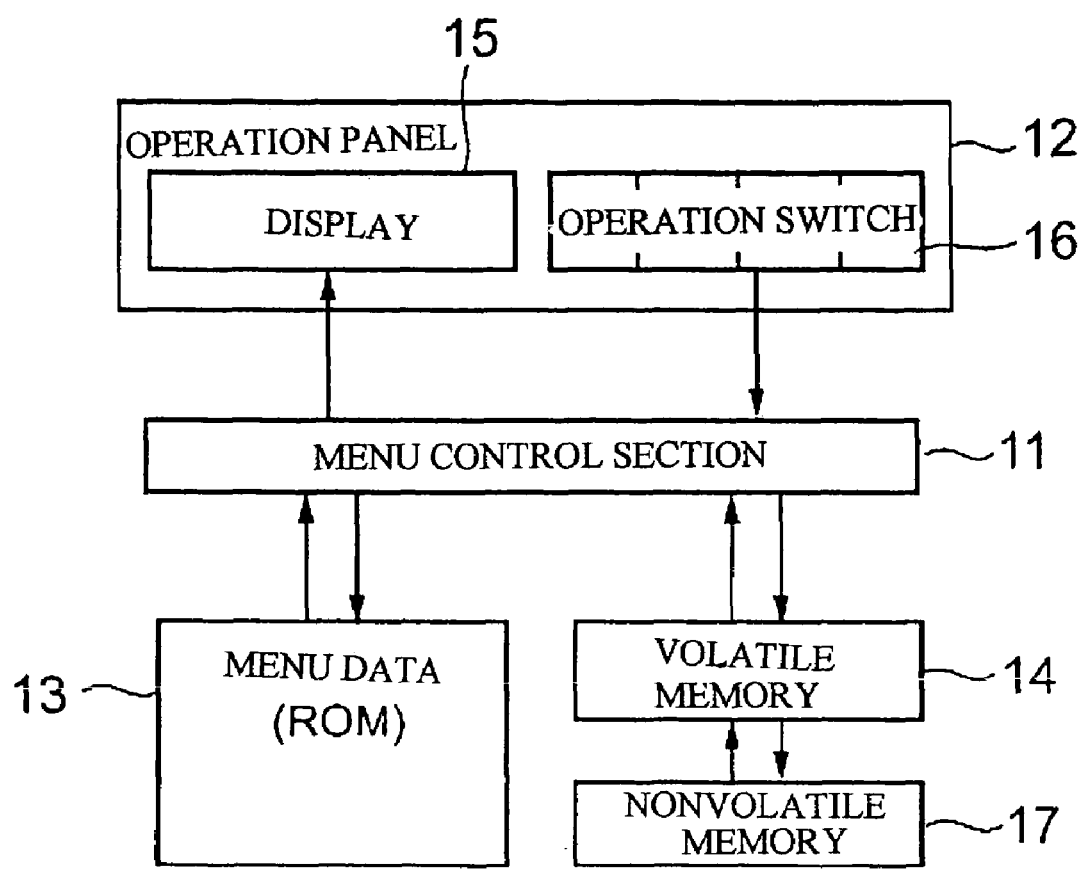
FIG. 1 is a block diagram of a printer according to the first embodiment of the invention.

FIG. 1 shows the structure of a printer, especially the section necessary for printing a menu map.

Figure 2:
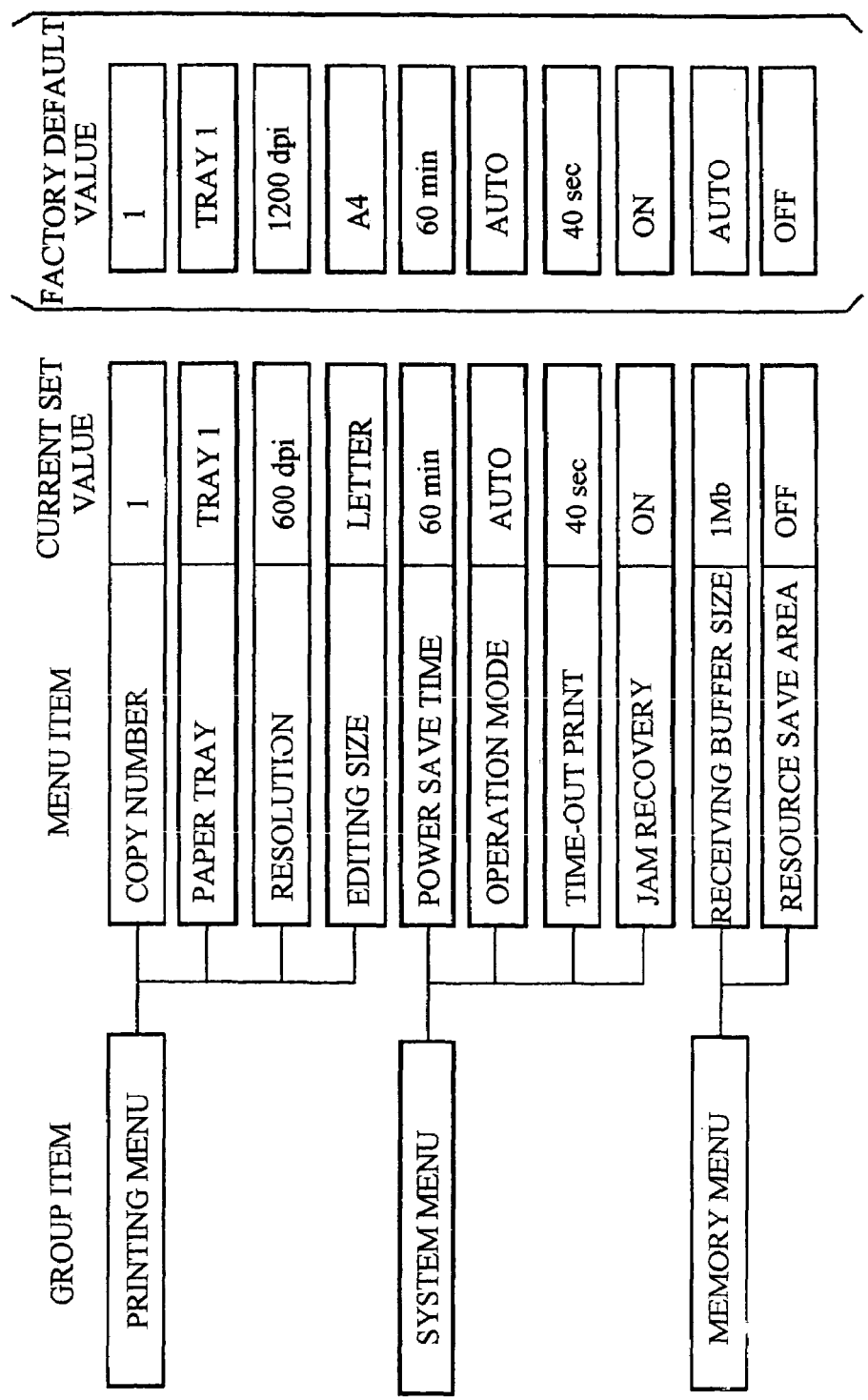
FIG. 2 is a diagram of menu items and their structure and values set.

As FIG. 2 shows, the menu items of a printer are divided in groups such as a printing menu, a system menu, and memory menu. Each menu has a plurality of menu items. For example, the printing menu has "copy number," "paper tray," "resolution," and "editing size" menu items. For these menu items, there are provided values set at a time of shipping from the factory. These factory default values are stored in the printer as initial values. In FIG. 2, the value of resolution was 1200 dpi at the factory default value but is changed to 600 dpi by the user. The editing size is changed from the factory default "A4" to "LETTER" by the user. In this way, the factory default values can be changed and the currently set values are stored in the printer memory. The menu items and their current set values are printed out on paper as a checking method.

In FIG. 1, the printer includes a menu control section 11 for controlling menu display and change of the set value. The menu control section 11 is connected to an operation panel 12, a menu data 13 of ROM, and a volatile memory 14. The operation panel 12 includes a display 15 for displaying the printer information for the user and an operation switch 16 operated by the user to input a printer instruction. The user manipulates the operation switch 16 to view the menu items and their set values. Also, it is possible to change the set values and start printing a menu map.

The menu data 13 includes menu items and their factory default values. Also, it contains character strings useful for displaying/printing menu items and set values for the respective menu items. Upon shipping from the factory, the nonvolatile memory 17 stores the same values as the factory default values of menu items stored in the menu data 13. Normally, the set value of a menu item is compared with that of the nonvolatile memory 17 or the volatile memory 14 that holds almost the same values as those of the nonvolatile memory 17.

When the printer power switch is turned on, the set values in the nonvolatile memory 17 are copied to the volatile memory 14. In the normal printing operation, comparison is made with the menu values stored in the volatile memory 14. When the set value of a menu item is changed in the menu mode, the content of the volatile memory 14 is changed. When the menu mode is finished, the content of the volatile memory 14 is copied to the nonvolatile memory 17. Thus, even if the printer power is turned off, the previously set value is reflected in the printer when power is turned on again. When the initialization process to the factory default setting is executed via the operation panel 12 (for example, depression of a predetermined switch), the factory default value in the menu data 13 is copied to the nonvolatile memory 17 as well as the volatile memory 14.

When the menu control section 11 receives from the operation switch 16 an instruction for changing the menu item to be displayed (for example, the menu item to be changed is inputted via the operation switch 16), it refers to the menu data 13 and sends to the display 15 the information about the menu item (the menu item and its set value). Thus, the display 15 shows the menu item to be changed by the user and its current set value. The user checks with the displayed menu item and its set value and inputs via the operation switch 16 the new set value for the menu item. When the confirmation key is depressed, the menu control section 11 recognizes the receipt of a command for changing the set value of a menu item from the operation switch 16. Thus, it writes the new set value in the nonvolatile memory 17 and the volatile memory 14 in the area corresponding to the menu item.

Figure 3:
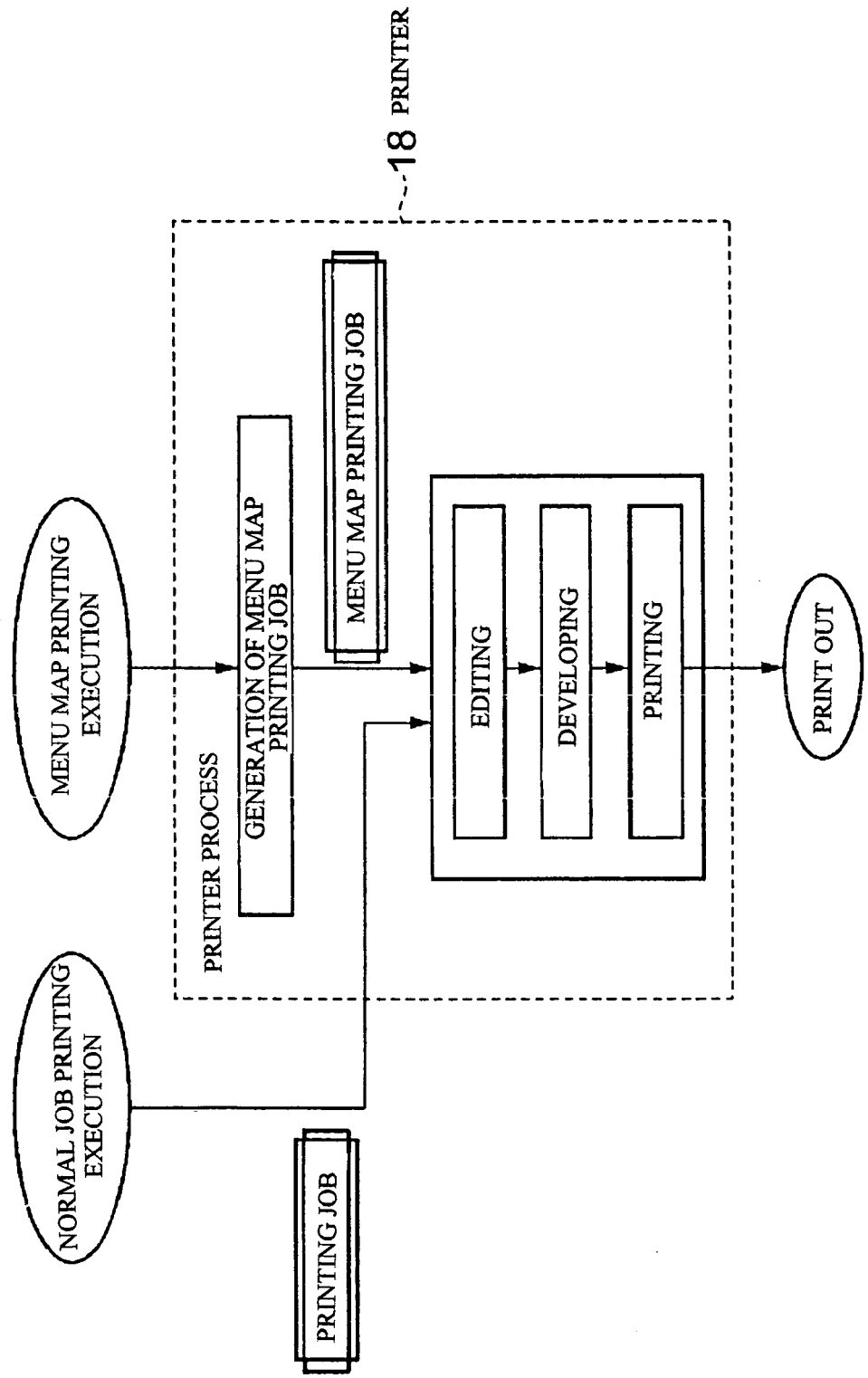
FIG. 3 is a block diagram of a printing operation according to the first embodiment.

The normal printing operation and the menu map printing operation will be described with reference to FIG. 3. For a normal printing job form a host computer (not shown), a printing job is generated with a page description language (PDL) in the host computer. This printing job is sent from the host computer to a printer 18 shown by broken line. The printing job is subjected in the printer 18 to the editing, developing, and printing processes to print the printing data on paper.

For the menu map printing, on the other hand, the printer 18 receives a menu map printing command from the operation panel 12 or the host computer. As a result, the menu map printing job generation process is started to generate a menu map printing job with PDL in the printer 18. This menu map printing job is subjected to the editing, developing, and printing processes to print a menu map. As shown in the above, the menu map printing type is determined by the generation of a menu map printing job.

FIG. 4 shows a menu map printed according to the first embodiment.

Figure 5:
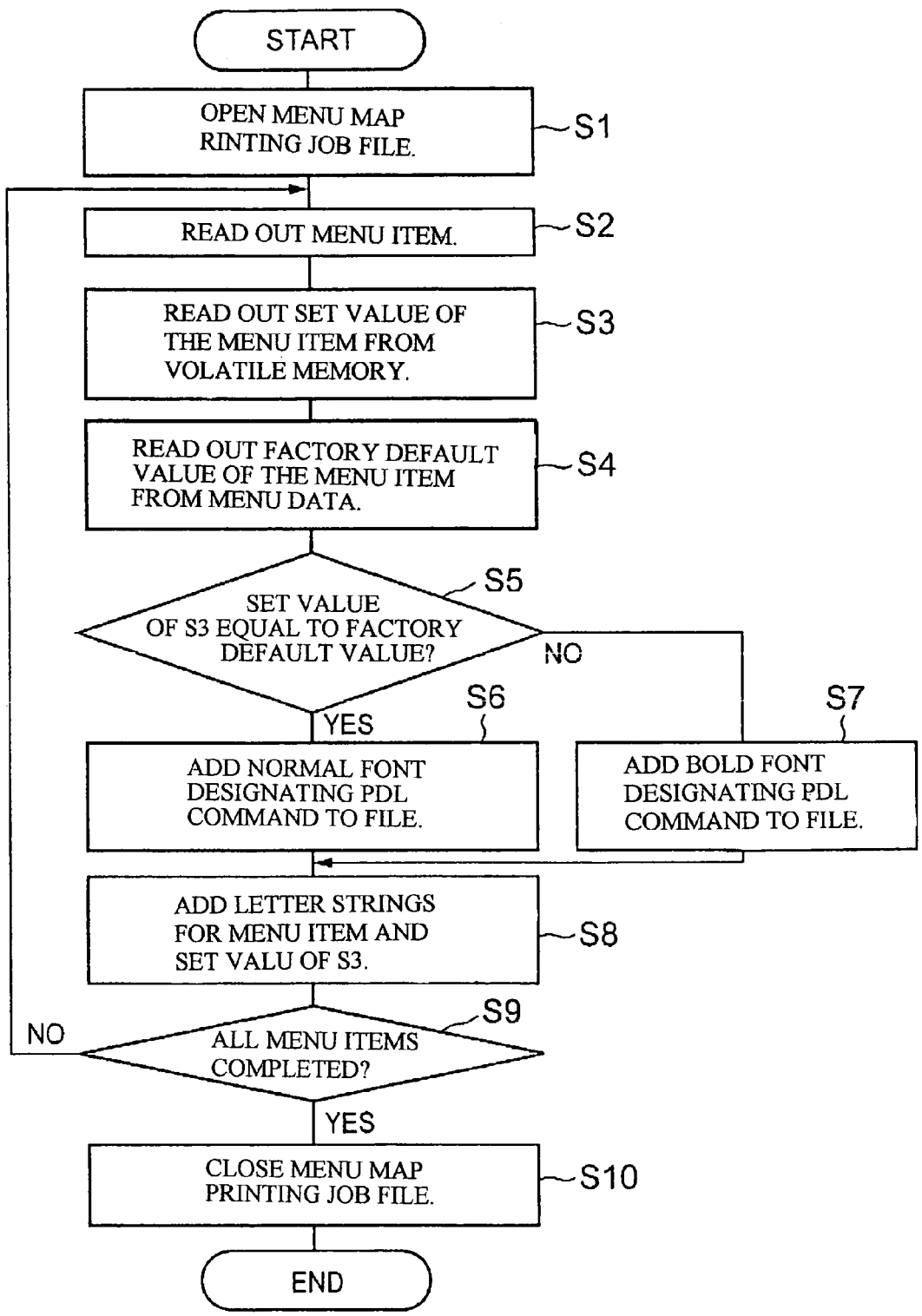
FIG. 5 is a flow chart of the generation of a menu map printing job.

The generation of a menu map printing job will be described with reference to FIG. 5.

In Step S1, since the printing job is handled as a job or file in the printer 18 in the same way as the received data, a file is opened to generate a menu map printing job file. A PDL command necessary for printing a menu map is inserted into the file. Finally, in Step S10, the file is closed to complete the generation of a menu map printing job file.

In Step S2, the menu items are read from the menu data 13 one after another in the order of the menu structure.

In Step S3, the set value of the same menu item as the menu item read out in Step S2 is read out from the volatile memory 14.

In Step S4, the factory default value of the menu item of S2 is read out of the menu data 13.

In Step S5, determination is made if the set value of Step S3 matches the factory default value of Step S4. If the determination result is "match", the menu item read out in the step S3 is considered as the menu item whose set value is not changed by the user, and the process goes to Step S6. If the determination result is "not match", the menu item of Step S3 is considered as the menu item whose set value is changed by the user, and the process goes to Step S7.

In Step S6, a PDL command for designating a normal font (for example, thin letters) that is used as a base in the menu map is inserted into the above file.

In Step S7, a PDL command for designating a font (for example, bold letters) different from the font designated in Step S6 is inserted into the above file. It is preferred that the font in Step S7 is clearly different from that of Step S6. The fonts designated in Steps S6 and S7 will not be changed until the next font designation is changed.

In Step S8, the strings of printing characters corresponding to the menu items read out in Steps S2 and S3 and to the set values are inserted into the above file.

In Step S9, determination is made if the above process is applied to the entire menu items. If all the menu items are inserted into the above file, the process goes to Step S10 and, otherwise, back to Step S2.

In Step S10, the above file is closed to end the generation of a menu map printing job file. The generated menu map printing job is subjected to the editing, developing, and printing processes to print a menu map.

As shown in FIG. 4, the menu items whose set values are changed from the factory default values and the current set values, and the menu item whose set values are not changed and the set values are printed with clearly different fonts in the printed menu map. That is, the set values of menu items "resolution," "editing size," and "receiving buffer size" are changed to "600 dpi," "LETTER," and "1 Mb" from the factory default values "1200 dpi," "A4," and "AUTO." In FIG. 5, the description is omitted for the insertion into the above file of the header and group item portions printed on the paper 19.

As has been described above, according to the first embodiment, the menu item whose set value has been changed by the user from the factory default value and the current set value are printed out on the paper 19 with the letters that are distinct from the those of the menu item whose set value is not changed and its set value in the printed menu map. Consequently, the observation of the printed menu map makes it possible to check if any value of a menu item has been changed from the factory default value, what is the menu item whose set value has been changed, and to what value it has been changed. Thus, it is possible to check the menu in a short time and prevent checking errors.

In the above embodiment, the distinction is made by the use of thin and bold letters but the italics or different font sizes may be used. Also, it is possible to use shading only for the changed. For color printers, the color may be changed. In addition, it is possible to add an asterisk or parenthesis, such as 600 dpi* or <600 dpi>, for making it distinctive. Also, it is possible to shift the printing position of the changed items from that of the unchanged or print them in different pages. Moreover, both the default values and the current set values are printed for the changed items but only the default values for the unchanged or the current set values.

Second Embodiment

According to the second embodiment, only the menu item whose set value is changed by the user from the factory default value and its set value are printed in a menu map. Such menu map printing hereinafter is called "user setting menu map printing." The printer structure and the operation of menu map printing are the same as those of the first embodiment and, therefore, only the generation of a user setting menu map printing job will be described.

That is, the set value of a certain menu item is changed from the factory default value. The changed set value is stored in the nonvolatile memory 17 and the volatile memory 14 in the same manner as that of the first embodiment.

Figure 6:
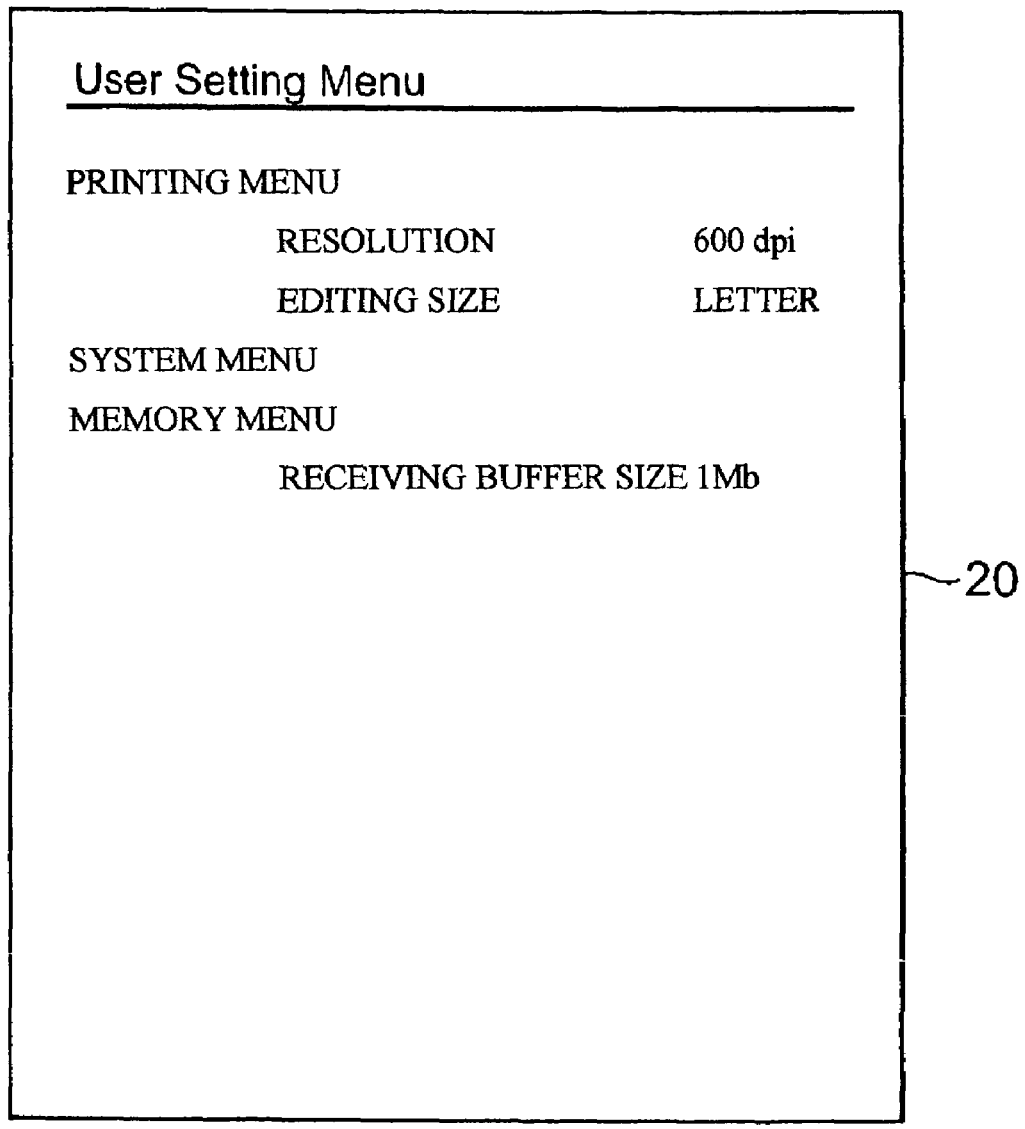
FIG. 6 is a diagram of a print-out for a menu map set by the user according to the second embodiment of the invention.
Figure 7:
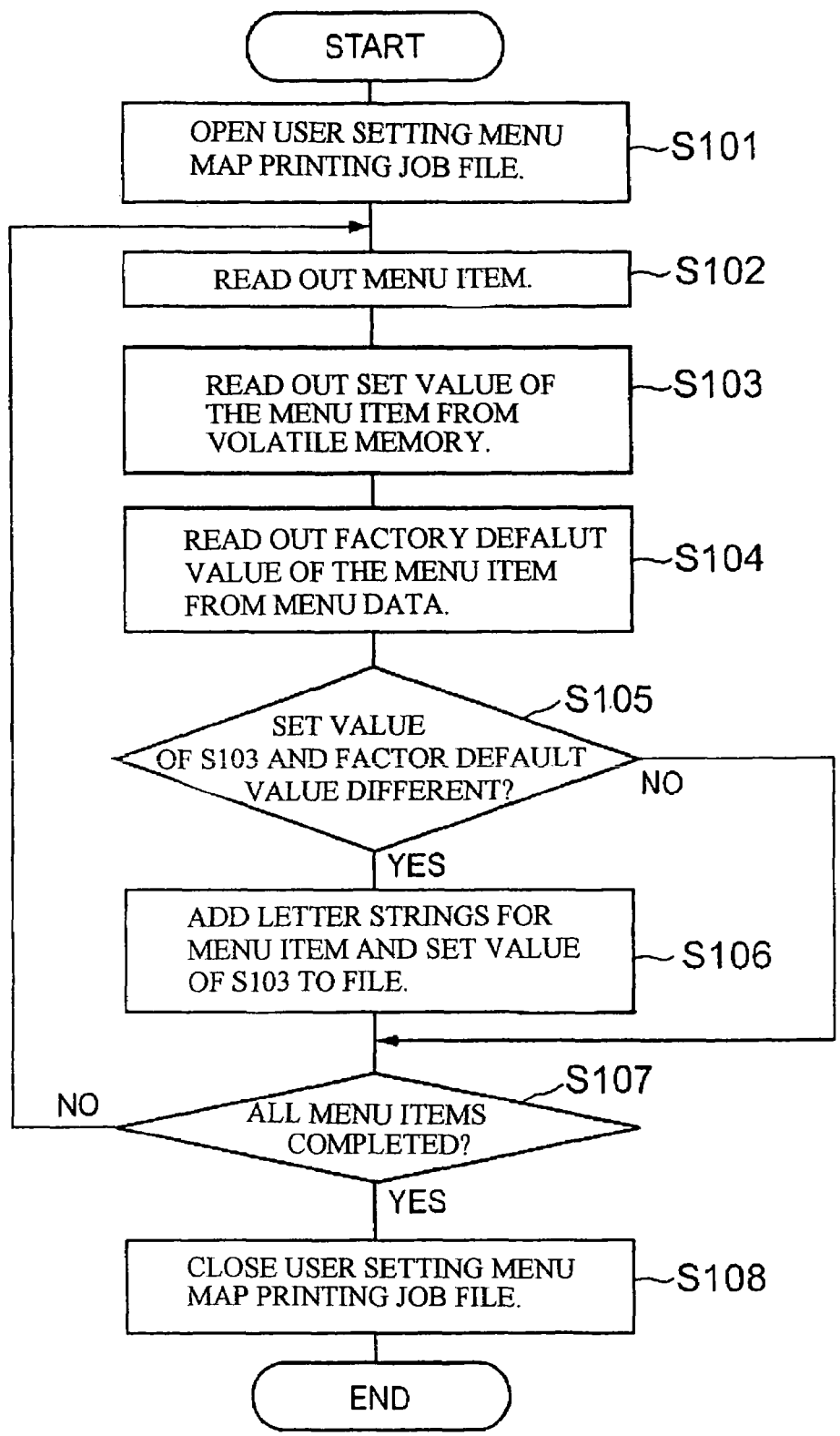
FIG. 7 is a flow chart of the generation of a printing job for the menu map set by the user.

FIG. 6 shows a user setting menu map print-out. The generation of a user setting menu map printing job will be described with reference to FIG. 7.

In Step S101, since the printing job is handled as a file in the printer 18, a user setting menu map printing job file is opened. A PDL command necessary for printing the user setting menu map is inserted into the above file and, in Step S108, the file is closed to complete the user setting menu map printing job file generation.

In Step S102, a menu item is read out of the menu data 13 in the order of the menu structure.

In Step S103, the set value of the same menu item as that of Step S102 is read out from the volatile memory 14.

In Step S104, the factory default value of the menu item read out in Step S102 is read out of the menu data 13.

In Step S105, determination is made whether the set value read out in Step S103 is different from the factory default value read out in Step S104. If the determination result is "not different", the menu item read out in Step S103 is considered as the menu item that is not changed by the user and the process goes to Step S107. If the determination result is "different", on the other hand, the menu item read out in Step S103 is considered as the menu item whose set value is changed by the user and the process goes to Step S106.

In Step S106, the printing letter strings for the menu items read out in Steps S102 and S103 and the set values of the menu items are added to the above file. This process adds to the file only the menu item whose set value has been changed by the user and its set value and no letter strings for the menu items whose set values are not changed by the user and their set values are not added to the file.

In Step S107, the above process is applied to the entire menu items. When the process is completed, it goes to Step S108 and, otherwise, back to Step S102.

In Step S108, the file is closed to end the generation of the user setting menu map printing job. The user setting menu map printing job is subjected to the editing, developing, and printing processes to print a menu map. The menu items whose set values have been changed from the factory default values and their current set values are printed on paper 20 as shown in FIG. 6. The addition to the file of the headers and group item portions printed in the paper 20 is omitted from the flow chart of FIG. 7.

As has been described above, according to the second embodiment, only the set values that have been changed by the user from the initial values and the corresponding menu items are printed on the paper 20. As a result, it is possible to instantly check whether there is any menu item whose set value has been changed from the factory default value, which is the menu item whose set value is changed by the user, and to what set value it is changed, thereby minimizing the checking time and error.

In the above embodiments, the menu items and the set values are printed on a medium but may be shown on a display that is provided on an operation panel of the image forming apparatus. The changed information may be sent to the preceding apparatus or host computer to show the changed information on the display. The sent information may be bit-map data or only the changed information that is edited in the host computer for display. The comparison between the factory default value and the current set value may be between the previously checked and held set value and the current set value so that it is easy to check the changes made since the last checking time.

As has been described above, according to the invention, there is provided an image forming apparatus, which is able to output menu items and set values set for the respective menu items, is able to output the set value changed from the initial value and the menu item corresponding to the set value distinctly from the unchanged items and values. Thus, the time for checking the menu change is minimized with fewer errors than before.

The invention claimed is:

1. An image forming apparatus, which is able to output menu items and set values respectively corresponding to the menu items, comprising:
   a first memory unit for storing a first one of the set values selectable through the menu items;
   a second memory unit for storing a second one of the set values selected by a user;
   a comparison unit for generating a first result when the first one is same as the second one and a second result when the first one is different from the second one; and
   an output unit for outputting a third result so that the first result is distinguished from the second result.

2. The image forming apparatus according to claim 1, wherein said output unit includes a printing unit for printing the third result on a medium.

3. The image forming apparatus according to claim 1, wherein said output unit includes a display unit for displaying the third result.

4. The image forming apparatus according to claim 1, wherein said output unit outputs the first result in a font different from that of the second result.

5. The image forming apparatus according to claim 1, wherein said output unit outputs the first result in a first bold font and the second result in a second bold font different from the first bold font.

6. The image forming apparatus according to claim 1, wherein said output unit outputs the first result in first italic letters and the second result in second italic letters different from the first italic letters.

7. The image forming apparatus according to claim 1, wherein said output unit outputs one of the first result and the second result with a mark added thereto.

8. The image forming apparatus according to claim 1, wherein said output unit outputs one of the first result and the second result in first letters and the other of the first result and the second result in second letters larger than the first letters.

9. The image forming apparatus according to claim 1, wherein said output unit outputs one of the first result and the second result with shading added thereto.

10. The image forming apparatus according to claim 1, wherein said output unit outputs only one of the first result and the second result.

* * * * *